US010404833B1

United States Patent
de Sales, Jr. et al.

(10) Patent No.: US 10,404,833 B1
(45) Date of Patent: Sep. 3, 2019

(54) CLOUD-BASED DYNAMIC SOFTWARE CONFIGURATION FOR GLOBAL MOBILE APPLICATIONS

(71) Applicant: INTUIT INC., Mountain View, CA (US)

(72) Inventors: Marcello Alves de Sales, Jr., San Diego, CA (US); Mark Hughes, San Diego, CA (US); Ryan Lynch, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 223 days.

(21) Appl. No.: 15/466,356

(22) Filed: Mar. 22, 2017

(51) Int. Cl.
  *G06F 15/16*  (2006.01)
  *G06F 15/177*  (2006.01)
  *H04L 29/08*  (2006.01)
  *H04L 29/06*  (2006.01)

(52) U.S. Cl.
  CPC .......... *H04L 67/34* (2013.01); *H04L 67/1097* (2013.01); *H04L 67/42* (2013.01)

(58) Field of Classification Search
  CPC ...... H04L 67/34; H04L 67/42; H04L 67/1097
  USPC .................................. 709/217–219, 220–222
  See application file for complete search history.

(56) References Cited

U.S. PATENT DOCUMENTS

| 6,928,644 | B1* | 8/2005 | Kroening | G06F 8/63 717/121 |
| 7,546,582 | B2* | 6/2009 | Smith | G06F 9/542 713/100 |
| 8,626,880 | B2* | 1/2014 | Zessin | G06F 9/4411 709/220 |
| 2013/0013753 | A1* | 1/2013 | Zessin | G06F 9/4411 709/221 |
| 2014/0325041 | A1* | 10/2014 | Xu | H04L 41/0816 709/221 |
| 2016/0132314 | A1* | 5/2016 | Solsona-Palomar | G06F 8/65 717/172 |
| 2018/0034641 | A1* | 2/2018 | Tiwari | H04L 63/0807 |

\* cited by examiner

*Primary Examiner* — Bharat Barot
(74) *Attorney, Agent, or Firm* — Patterson + Sheridan, LLP (57) ABSTRACT

The present disclosure relates to dynamic software configuration. In some embodiments, a client device of a plurality of client devices requests a configuration. The request may comprise information identifying an environment of the client device. In some embodiments, the configuration request is compared to a baseline configuration and a custom configuration. The baseline configuration may comprise values corresponding to a plurality of dynamic properties, and the custom configuration may comprise values corresponding to a subset of the plurality of dynamic properties. Device. In some embodiments, upon determining, based on the comparing, that the custom configuration is applicable to the environment of the client device, the client device is provided with a client configuration comprising the values from the baseline configuration wherein the values of the subset of the plurality of dynamic properties are replaced by the values from the custom configuration.

21 Claims, 5 Drawing Sheets

410
```
http.timeout = 30
server.interface = ::0
server.port = 443
ssl.protocols = TLSv1.2 TLSv1.1 TLSv1
ssl.ciphers = DHE-RSA-AES256-SHA:DHE-DSS-AES256-SHA
ssl.certificate = /dev/shm/certs/service.intuit.com/key
```

420
```
server.port = 449
ssl.certificate = /dev/shm/certs/service.intuit.com/key2
```

430
```
http.timeout = 30
server.interface = ::0
server.port = 449
ssl.protocols = TLSv1.2 TLSv1.1 TLSv1
ssl.ciphers = DHE-RSA-AES256-SHA:DHE-DSS-AES256-SHA
ssl.certificate = /dev/shm/certs/service.intuit.com/key2
```

CLOUD-BASED DYNAMIC SOFTWARE CONFIGURATION FOR GLOBAL MOBILE APPLICATIONS

FIELD

Embodiments presented herein generally relate to centralized dynamic software configuration, and more specifically to cloud-based dynamic software configuration for global mobile applications.

DESCRIPTION OF THE RELATED ART

Microservices represent a paradigm shift in software architecture, and generally involve designing software applications as suites of distributed, independently deployable services. An application may, for example, be separated into a plurality of individual services based on business functionality, and these individual services may be distributed across a plurality of servers. These services may be accessed by applications running all over the world (e.g. on mobile devices) through application programming interface (API) calls. The granularity of microservices is helpful in isolating functionality in a distributed software application so that the entire suite does not have to be redeployed every time a change is made to an individual component.

The use of microservices generally requires configuration properties to be stored in centralized configuration servers. This is because configurations are generally changed more frequently than the applications which they configure, and different configurations are often required for different environments (e.g. development, quality assurance, production, etc.). It would be inefficient and redundant to embed the configuration properties within every individual service in a microservices architecture because changing the configuration would require rebuilding and redeploying the entire suite of services. As such, configuration properties are generally maintained in a plurality of centralized configuration servers which are accessible to the services and endpoint applications which use the services.

When microservices applications are used on a worldwide scale, it becomes necessary to deploy configuration servers to data centers all around the world in order to handle to traffic. This can become costly and difficult to maintain, and keeping the configuration servers synchronized can be challenging. As such there is a need for better way to manage centralized configuration for global mobile applications.

SUMMARY

One embodiment of the present disclosure includes a computer-implemented method for dynamic software configuration. The method generally includes receiving, from a client device of a plurality of client devices, a configuration request, wherein the request comprises information identifying an environment of the client device. The method further includes comparing the configuration request to a baseline configuration and a custom configuration, wherein the baseline configuration comprises values corresponding to a plurality of dynamic properties, and wherein the custom configuration comprises values corresponding to a subset of the plurality of dynamic properties. Upon determining, based on the comparing, that the custom configuration is applicable to the environment of the client device, the method further includes providing, to the client device, a client configuration comprising the values from the baseline configuration wherein the values of the subset of the plurality of dynamic properties are replaced by the values from the custom configuration.

Another embodiment of the present disclosure includes a processor and a memory storing a program, which, when executed on the processor, performs the method for dynamic software configuration described above.

Still another embodiment provides a non-transitory computer-readable storage medium having instructions, which, when executed on a processor, performs the method for dynamic software configuration described above.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Centralized software configuration generally involves storing configuration properties and values (e.g. in the form of configuration files) at a central location from which they can be retrieved by applications. It is common for centralized configuration to be used for applications developed using a microservices architecture in which different functions of the application are distributed among a plurality of independent services. In some cases, it is advantageous to centrally store a plurality of different configurations applicable to different environments in which the application is to be employed. Embodiments presented herein relate to cloud-based dynamic software configuration for global mobile applications.

In some embodiments of the present disclosure, a centralized configuration system allows for a baseline configuration to be defined (e.g. by a configuration file stored in a repository). Additional custom configurations (e.g. relating to particular environments) may also be defined which modify a portion of the baseline configuration. In certain embodiments, an application may be able to request a configuration from the centralized configuration system and receive an appropriate configuration in response.

Figure 1:
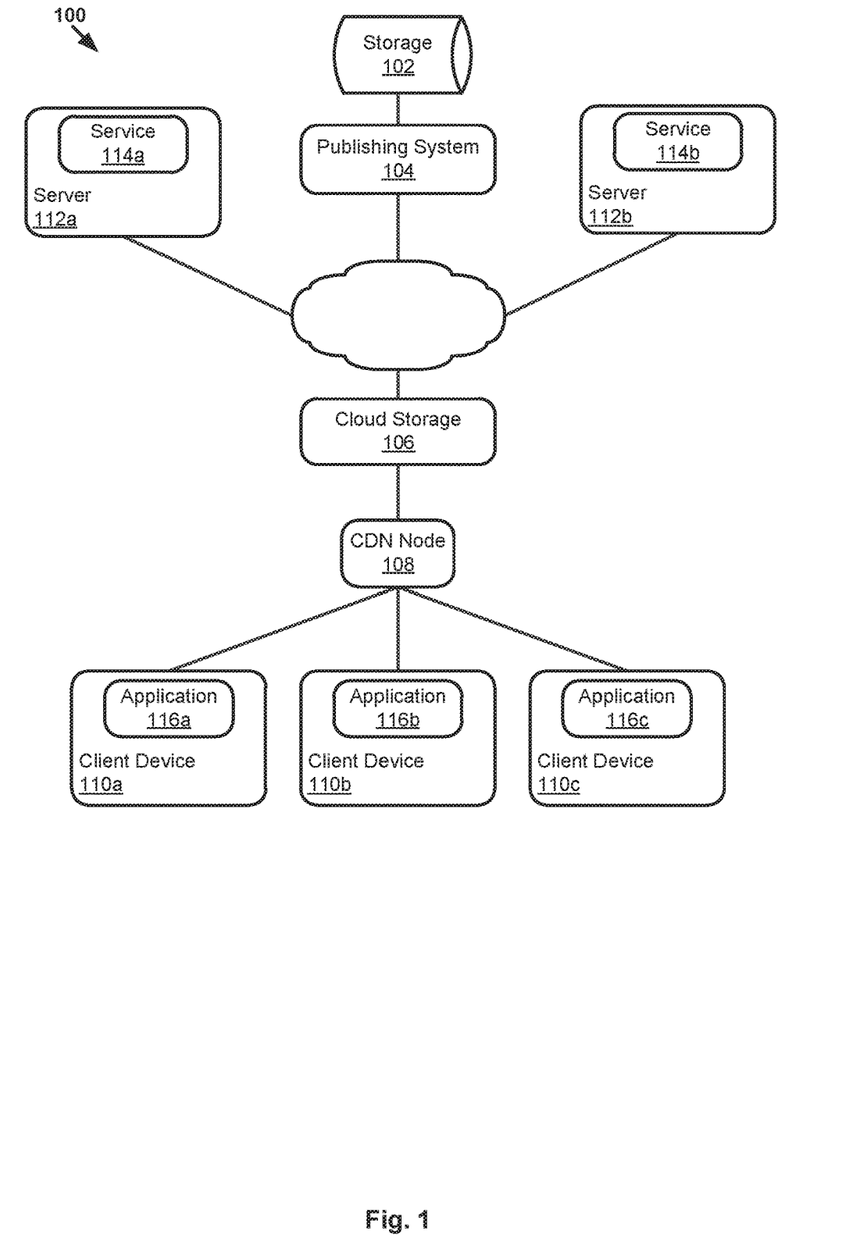
FIG. 1 illustrates an example computing environment, according to one embodiment.

FIG. 1 illustrates an example computing environment for cloud-based centralized software configuration for global mobile applications, according to some embodiments. As illustrated, computing environment 100 includes a storage 102, a publishing system 104, a cloud storage 106, a plurality of servers 112, a content delivery network node 108, and a plurality of client devices 110.

Storage 102 may, for example, comprise a database or repository for storing configuration information. For instance, configuration files may be created and modified by users who commit the files to storage 102. In some embodiments, a user creates a baseline configuration comprising a file which lists values for a plurality of dynamic properties and stores the baseline configuration in storage 102. The user may also create one or more custom configurations comprising files (e.g. metadata files) which list values for a subset of the plurality of dynamic properties from the baseline configuration and store these custom configurations in storage 102. Each custom configuration may, for example, relate to a particular environment in which the application is to be employed.

Publishing system 104 may comprise a physical or virtual computing entity which pulls configuration information from storage 102 and makes it available to other entities. In some embodiments, publishing system 104 may generate environment specific configurations by overlaying the baseline configuration with custom configurations (e.g. replacing the values of certain dynamic properties in the baseline configuration with values from the custom configuration) before providing the environment specific configurations to other entities. In certain embodiments, publishing system 104 may also encrypt configuration information before publishing it.

Servers 112 may be implemented as physical or virtual server devices, and may run a plurality of services 114. In some embodiments, services 114 execute within virtual machines running on servers 112. Services 114 may, for example, comprise software microservices associated with a global mobile application, each of which may be associated with a distinct function of the application. Services 114 may, for example, periodically pull configuration information from publishing system 104 so that they remain properly configured.

Cloud storage 106 may, for example, comprise a physical or virtual storage entity which allows stored content (e.g. configuration information) to be accessed over the internet.

Content delivery network (CDN) node 108 may, for example comprise one of a plurality of nodes in a content delivery network which allows content (e.g. configuration information) to be accessed by a plurality of client devices 110.

Client devices 110 may, for example, comprise one or more physical or virtual computing entities which execute applications 116. A client device 110 may pull configuration information from CDN node 108 in order to configure an application 116. A client device 110a may run an application 116 in a particular environment (e.g. a development environment), and may be provided with a configuration which is appropriate for the particular environment.

While the components in computing environment 100 are depicted separately, certain components may be implemented either together or separately.

Figure 2:
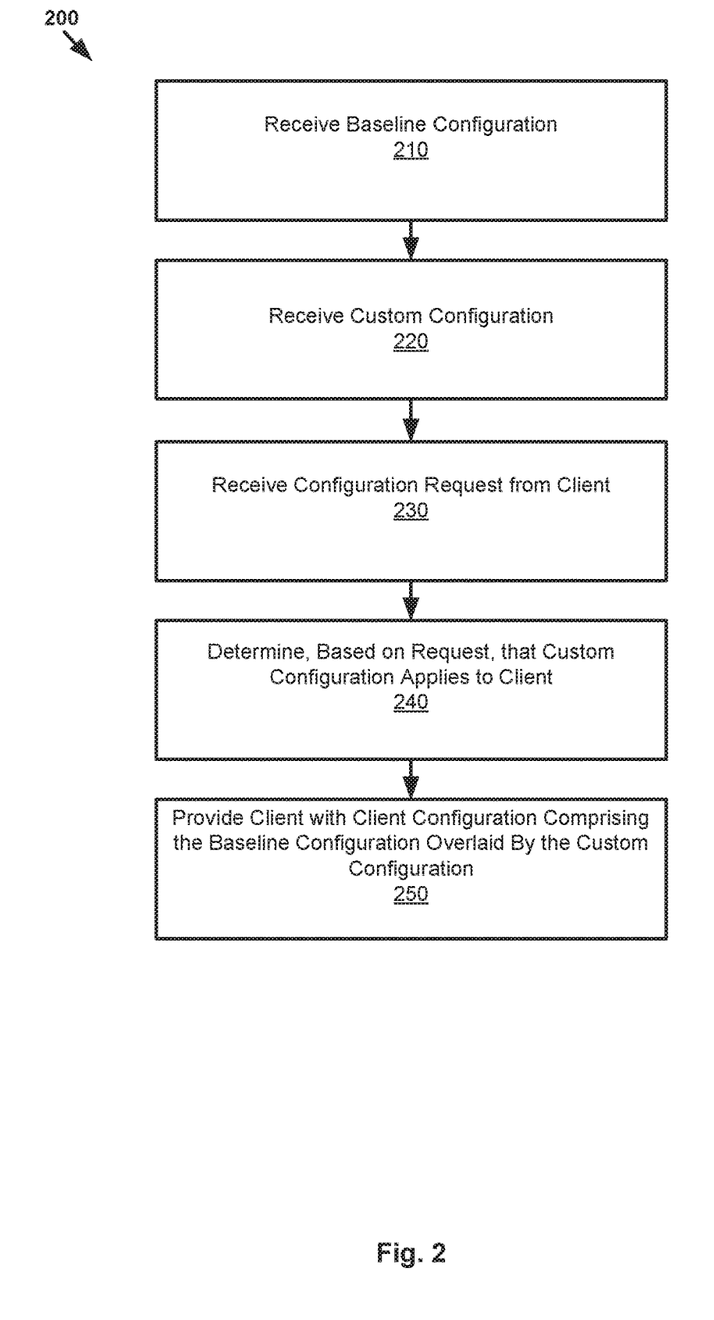
FIG. 2 illustrates example operations for dynamic software configuration according to certain embodiments.

FIG. 2 illustrates example operations 200 for dynamic software configuration according to certain embodiments.

At 210, a baseline configuration is received. For example, a user may generate a baseline configuration as a file comprising values for a plurality of dynamic properties and store the file in storage 102 (e.g. by checking the file into a repository). The baseline configuration may generally define the default values which are generally to be used for configuring the application in the absence of a custom configuration designed for a particular environment.

At 220, a custom configuration is received. For example, a user may define a custom configuration as a file which specifies values for a subset of the plurality of dynamic properties defined in the baseline configuration, storing the file in storage 102 (e.g. by checking the file into a repository). The custom configuration may correspond to a particular environment (e.g. a production environment), including configuration values which are ideal for the particular environment, and may include information indicating that the custom configuration relates the particular environment. The custom configuration may be designed to "overlay" the baseline configuration such that the values from the baseline configuration which correspond to the subset of the plurality of dynamic properties may be overridden by the values from the custom configuration.

In some embodiments, when a user commits a new or updated configuration file to storage 102, a process (e.g. a web hook) will be initiated which causes the configuration to be retrieved from storage 102 and prepared for publishing by publishing system 104. Publishing system 104 may then provide the configuration to cloud storage 106, from which it may be retrieved by CDN node 108 to provide to a client device 110 upon request. The processing involved in preparing a configuration for publishing may include, for example, verifying that the configuration is complete and accurate. Verification may comprise, for example, comparing the dynamic properties and associated values in the configuration with a matrix file listing all valid configurations. In the case of a custom configuration, the processing may also involve generating a client configuration by "overlaying" the baseline configuration with the custom configuration before verifying the client configuration. This process will be described in more detail below with respect to FIG. 3.

At 230, a configuration request is received from a client. For example, a client device 110 may send a request to CDN node 108 for a configuration for application 116. Each client device 110 may periodically transmit a configuration request in order to ensure that it has the most updated configuration. The request may, for example, include information about client device 110 and application 116, such as the environment in which application 116 is being executed. This information may be used by CDN node 108 to determine the appropriate configuration to provide to client device 110 in response.

At 240, it is determined, based on the request, that the custom configuration applies to the requesting client. For example, CDN node 108 may identify, based on the environment information included in the request, that client device 110 is running application 116 in a production environment. CDN node 108 may then identify that the custom configuration (received at 220 above) relates to the production environment. Consequently, CDN node 108 may determine that the custom configuration is the appropriate configuration for client device 110.

At 250, the client receives, in response to the request, a client configuration comprising the baseline configuration overlaid by the custom configuration. For example, CDN node 108 may, upon determining that the custom configuration is appropriate for client device 110, provide this configuration to client device 110. The client configuration may, for example, have been generated by publishing system 104 when the custom configuration was first committed to storage 102 by overlaying the baseline configuration with the custom configuration, and stored in cloud storage 106. CDN node 108 may retrieve the client configuration from cloud storage 106 in order to provide it to client device 110. Client device 110 may then use the client configuration to configure application 116.

Figure 3:
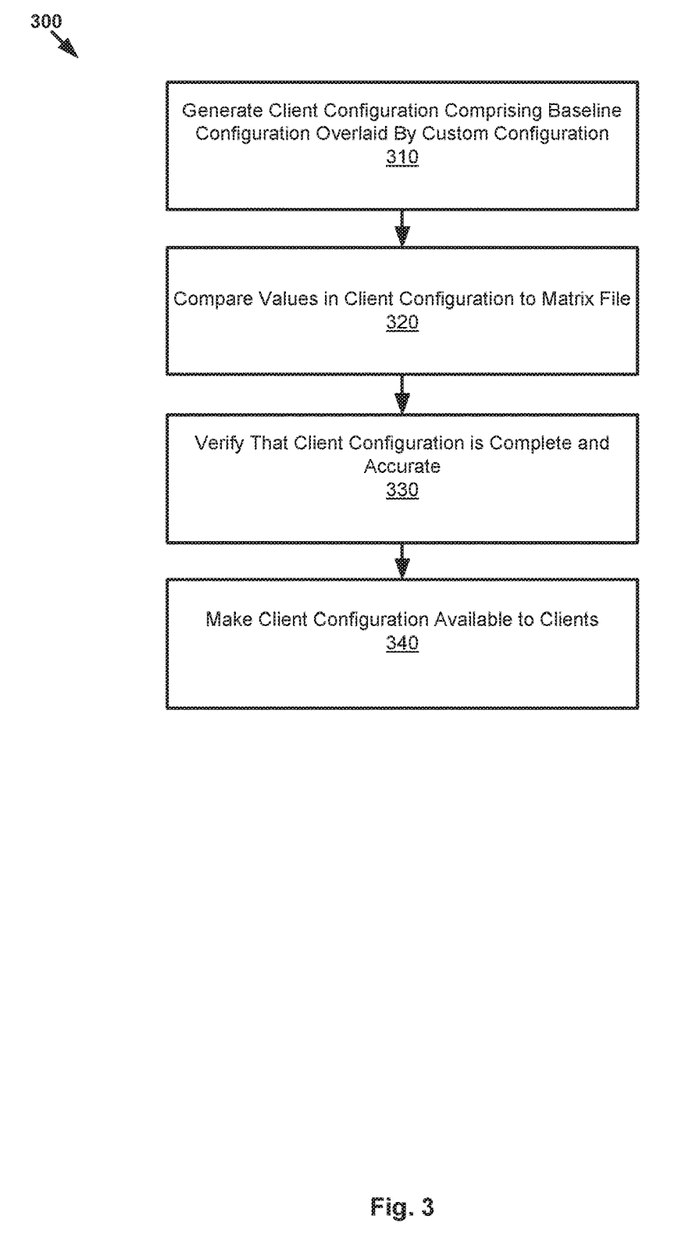
FIG. 3 illustrates example operations for generating and verifying a client configuration according to certain embodiments.

FIG. 3 illustrates example operations 300 for generating and verifying a client configuration according to certain embodiments.

At 310, a client configuration is generated which comprises a baseline configuration overlaid by a custom configuration. This may be performed, for example, by publishing system 104, and may comprise overriding certain values in the baseline configuration with values from the custom configuration. The client configuration may correspond to a particular environment in which the application it configures is to be employed, and may include information identifying the particular environment. The client configuration may be generated, for example, after a user commits the custom configuration (either new or updated) to storage 102.

At 320, the client configuration may be verified by comparing the values in the client configuration to a matrix file. The matrix file may, for example, comprise a listing of all valid configurations (e.g. all acceptable values for all possible dynamic properties). In some embodiments, the matrix file is populated in advance by a user and stored in storage 102. Publishing system 104 may, for example, retrieve the matrix file from storage 102 and compare the values of all dynamic properties in the client configuration to the matrix file.

At 330, a determination is made, based on the comparison with the matrix file, as to whether the client configuration is complete and accurate. The determination may be made based on whether or not the value for every dynamic property in the client configuration matches an acceptable value for the dynamic property listed in the matrix file. The determination may also be based on whether or not the client configuration includes a value for every dynamic property at all. If publishing system 104, for example, determines that the client configuration is complete and accurate, it may consider the client configuration to be "verified."

At 340, having been verified, the client configuration is made available to clients. For example, publishing system 104 may provide the client configuration to cloud storage 106, from which it may be obtained by CDN node 108 to provide to a client device 110 upon request. Each client device 110 may, for example, periodically request a configuration from CDN node 108. Each client device 110 may then receive an appropriate client configuration (e.g. based on the environment in which client device 110 is running application 116, the IP address of client device 110, etc.) in response, and use this client configuration to configure application 116.

Publishing system 104 may generate updated client configurations every time an updated baseline configuration or custom configuration is committed to storage 102. For example, if a change is made to the baseline configuration, all client configurations will need to be updated, including those based on custom configurations. When a custom configuration is changed, only the client configurations related to the custom configuration will need to be updated. Every time an updated client configuration is generated.

Figure 4:
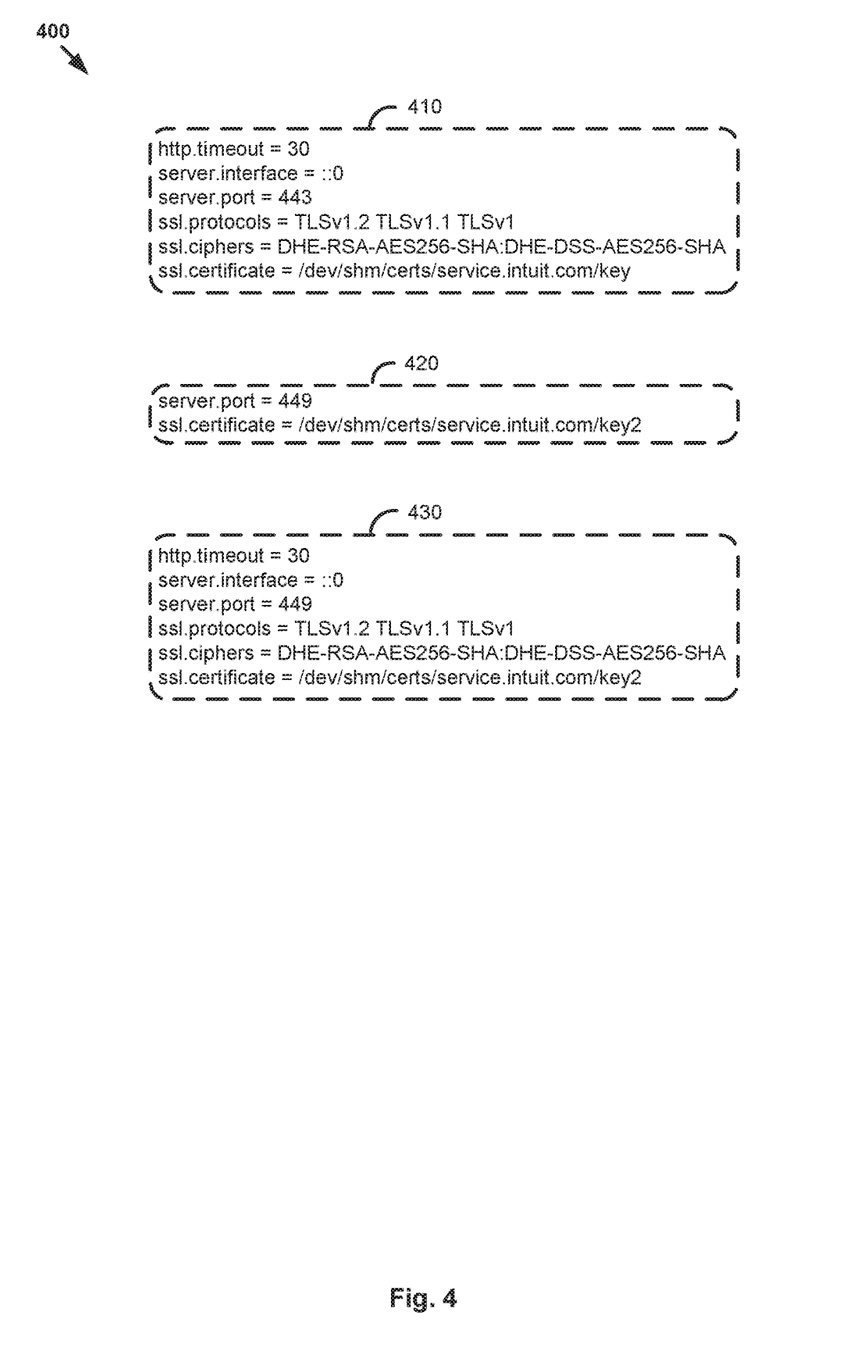
FIG. 4 is an illustration of an example baseline configuration, custom configuration, and client configuration according to certain embodiments.

FIG. 4 is an illustration 400 of an example baseline configuration 410, custom configuration 420, and client configuration 430 according to certain embodiments.

Baseline configuration 410 may comprise, for example, a configuration file defined by a user and committed to storage 102. As shown, baseline configuration 410 may comprise a plurality of dynamic properties (e.g. http.timeout) with corresponding values (e.g. 30). The values listed in the baseline configuration 410 may, for example, comprise default values which are to be used in the absence of a custom configuration for a particular environment.

Custom configuration 420 may comprise, for example, a custom configuration file defined by a user and committed to storage 102. As shown, custom configuration 420 may comprise a subset of the plurality of dynamic properties included in baseline configuration 410 (e.g. server.port) with associated values (e.g. 449). The values in custom configuration 420 may correspond to a particular environment (e.g. production), and the particular environment may be identified in information associated with custom configuration 420. In some embodiments, custom configuration 420 comprises a metadata file associated with baseline configuration 410.

Client configuration 430 may comprise, for example, a configuration generated by publishing system 104 for a particular environment by "overlaying" baseline configuration 410 with custom configuration 420. As shown, client configuration 430 includes all of the dynamic properties from baseline configuration 410. The values from baseline configuration 410 are also included in client configuration 430, except that the values for the subset of dynamic properties (e.g. ssl.certificate) are overridden by the values from custom configuration 420 (e.g. /dev/shm/certs/service-.intuit.com/key2). Client configuration 430 may be published to cloud storage 106, from which it is retrieved by CDN node 108 to provide to a requesting client device 110. A client configuration may also be generated for the baseline configuration (e.g. no change necessary) and any other custom configurations defined by a user.

In some embodiments, a signature is transmitted from CDN node 108 along with client configuration 430. A client device 110 which receives client configuration 430 may use the signature to authenticate the client configuration 430 (e.g. to verify that it comes from a trusted source). The signature may be generated based on the configuration data itself and a "secret" (e.g. a private key) shared between publishing system 104 and client devices 110. Because each client device 110 knows the secret, it will be able to calculate the signature itself using the secret and the client configuration, and thereby determine whether the signature accompanying the client configuration is accurate. The signature may be calculated by publishing system 104 and provided to cloud storage 106, from which it may be retrieved by CDN node 108 to provide to a client device 110 along with client configuration 430.

In certain embodiments, client configuration 430 may also be encrypted (e.g. by publishing system 104), and a receiving client device 110 may use an encryption key to decrypt client configuration 430. Client device 110 may, for example, receive an encryption key separately from publishing system 104.

Services 114 on servers 112 may also request configurations from publishing system 104, and may receive appropriate configurations in response. For example, a service 114 may periodically request a configuration from publishing system 104, and may receive the most up-to-date version of the appropriate configuration (e.g. the baseline configuration) in response. This allows services 114 to stay current in their configuration. In some embodiments, servers 112 may request configurations from a separate component which retrieves the appropriate configuration from publishing system 104.

Figure 5:
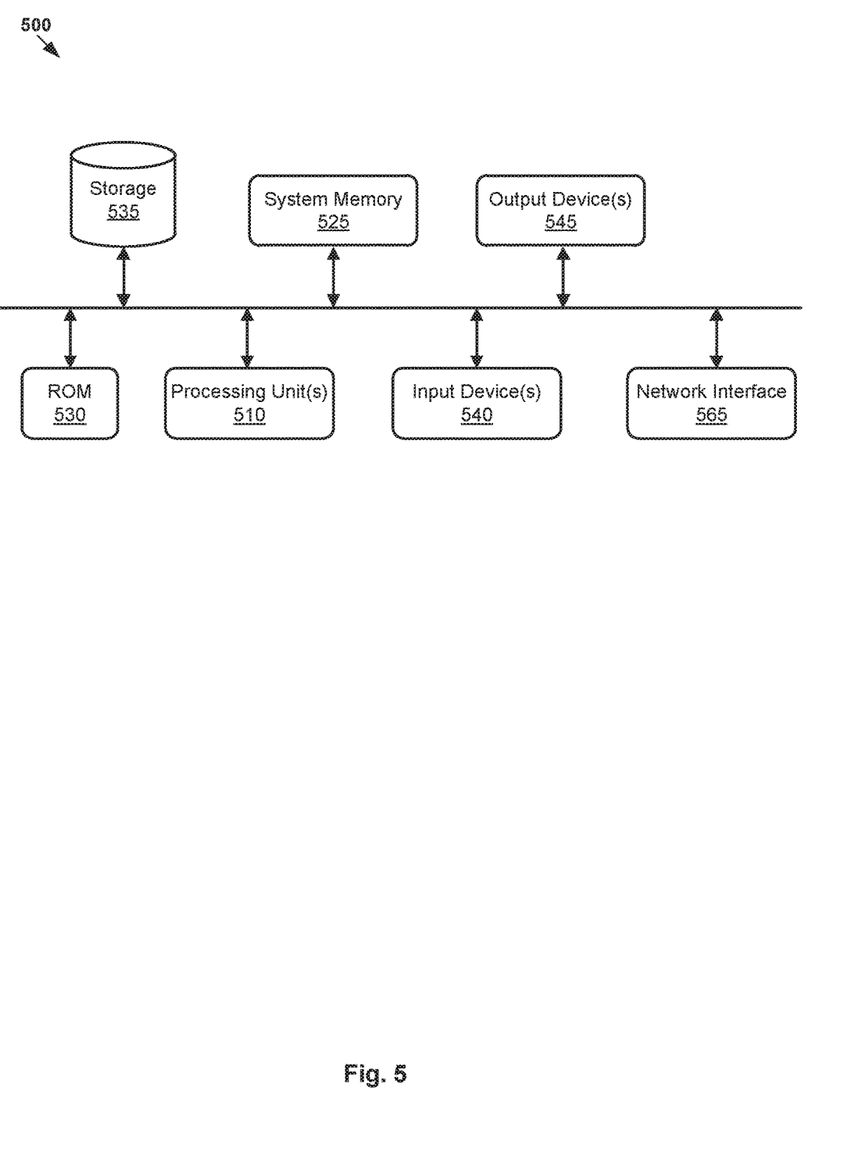
FIG. 5 illustrates a computer system with which some embodiments of the present disclosure may be implemented.

FIG. 5 illustrates an example of an electronic system 500 with which some embodiments of the invention are implemented. The electronic system 500 can be used to execute any of the functionality described above. The electronic system 500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the electronic system 500. For instance, the bus 505 communicatively connects the processing unit(s) 55 with the read-only memory 530, the system memory 525, and the permanent storage device 535.

From these various memory units, the processing unit(s) 510 retrieve instructions to execute and data to process in order to execute the processes of the invention. The processing unit(s) may be a single processor or a multi-core processor in different embodiments.

The read-only-memory (ROM) 530 stores static data and instructions that are needed by the processing unit(s) 510 and other modules of the electronic system. The permanent storage device 535, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 535.

Other embodiments use a removable storage device (such as a floppy disk, flash drive, etc.) as the permanent storage device. Like the permanent storage device 535, the system memory 525 is a read-and-write memory device. However, unlike storage device 535, the system memory is a volatile read-and-write memory, such a random access memory. The system memory stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices enable the user to communicate information and select commands to the electronic system. The input devices 540 include alphanumeric keyboards and pointing devices (also called "cursor control devices"). The output devices 545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 5, bus 505 also couples electronic system 500 to a network 565 through a network adapter (not shown). In this manner, the computer can be a part of a network of computers (such as a local area network ("LAN"), a wide area network ("WAN"), or an Intranet, or a network of networks, such as the Internet. Any or all components of electronic system 500 may be used in conjunction with the invention.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:
1. A computer-implemented method for dynamic software configuration, comprising:
  receiving, from a client device, a configuration request for a software application, wherein:

the configuration request comprises information identifying an environment of the client device, and the environment of the client device comprises either a development environment or a production environment in which the software application is executed;

comparing the configuration request to a baseline configuration and a custom configuration, wherein:

the baseline configuration comprises values for a plurality of dynamic properties of the software application, and the custom configuration comprises values for a subset of the plurality of dynamic properties of the software application;

determining, based on the comparing, that the custom configuration is applicable to the environment of the client device;

generating a signature that is based on at least:

the values for the subset of the plurality of dynamic properties of the software application from the custom configuration, and a secret that is shared with the client device, and providing, to the client device, the signature and a client configuration comprising the values for the plurality of dynamic properties of the software application from the baseline configuration, wherein values from the baseline configuration for the subset of the plurality of dynamic properties of the software application are replaced in the client configuration by the values for the subset of the plurality of dynamic properties of the software application from the custom configuration.

2. The computer-implemented method of claim 1, further comprising:

receiving an updated baseline configuration;

receiving, from a given client device, a given configuration request, wherein the given configuration request comprises information identifying an environment of the given client device; and upon determining, based on the given configuration request, that the custom configuration is applicable to the environment of the given client device: providing, to the given client device, a given client configuration comprising the values from the updated baseline configuration wherein the values of the subset of the plurality of dynamic properties are replaced by the values from the custom configuration.

3. The computer-implemented method of claim 1, wherein, before the client configuration is provided to the client device, the client configuration is verified by:

determining, based on a matrix file comprising permissible configurations, whether the client configuration is permissible.

4. The computer-implemented method of claim 1, further comprising:

receiving an updated custom configuration;

receiving, from a given client device, a given configuration request, wherein the given configuration request comprises information identifying an environment of the given client device; and upon determining, based on the given configuration request, that the custom configuration is applicable to the environment of the given client device: providing, to the given client device, a client configuration comprising the values from the baseline configuration wherein the values of the subset of the plurality of dynamic properties are replaced by the values from the updated custom configuration.

5. The computer-implemented method of claim 1, wherein the client device authenticates the client configuration based on the signature associated with the client configuration.

6. The computer-implemented method of claim 1, wherein the client configuration is encrypted, and the client device decrypts the client configuration using an encryption key.

7. The computer-implemented method of claim 1, wherein the client configuration is provided to the client device from a cloud storage using a global content delivery network (CDN).

8. A system, comprising:

a processor; and memory storing instructions which, when executed on one or more processors, performs a method for dynamic software configuration, the method comprising:

receiving, from a client device, a configuration request for a software application, wherein:

the configuration request comprises information identifying an environment of the client device, and the environment of the client device comprises either a development environment or a production environment in which the software application is executed;

comparing the configuration request to a baseline configuration and a custom configuration, wherein:

the baseline configuration comprises values for a plurality of dynamic properties of the software application, and the custom configuration comprises values for a subset of the plurality of dynamic properties of the software application;

determining, based on the comparing, that the custom configuration is applicable to the environment of the client device;

generating a signature that is based on at least:

the values for the subset of the plurality of dynamic properties of the software application from the custom configuration; and a secret that is shared with the client device; and providing, to the client device, the signature and a client configuration comprising the values for the plurality of dynamic properties of the software application from the baseline configuration, wherein values from the baseline configuration for the subset of the plurality of dynamic properties of the software application are replaced in the client configuration by the values for the subset of the plurality of dynamic properties of the software application from the custom configuration.

9. The system of claim 8, wherein the method further comprises:

receiving an updated baseline configuration;

receiving, from a given client device, a given configuration request, wherein the given configuration request comprises information identifying an environment of the given client device; and upon determining, based on the given configuration request, that the custom configuration is applicable to the environment of the given client device: providing, to the given client device, a given client configuration comprising the values from the updated baseline configuration wherein the values of the subset of the plurality of dynamic properties are replaced by the values from the custom configuration.

10. The system of claim 8, wherein, before the client configuration is provided to the client device, the client configuration is verified by:
  determining, based on a matrix file comprising permissible configurations, whether the client configuration is permissible.

11. The system of claim 8, wherein the method further comprises:
  receiving an updated custom configuration;
  receiving, from a given client device, a given configuration request, wherein the given configuration request comprises information identifying an environment of the given client device; and
  upon determining, based on the given configuration request, that the custom configuration is applicable to the environment of the given client device: providing, to the given client device, a client configuration comprising the values from the baseline configuration wherein the values of the subset of the plurality of dynamic properties are replaced by the values from the updated custom configuration.

12. The system of claim 8, wherein the client device authenticates the client configuration based on the signature associated with the client configuration.

13. The system of claim 8, wherein the client configuration is encrypted, and the client device decrypts the client configuration using an encryption key.

14. The system of claim 8, wherein the client configuration is provided to the client device from a cloud storage using a global content delivery network (CDN).

15. A non-transitory computer-readable medium comprising instructions which, when executed on one or more processors, performs a method for dynamic software configuration, the method comprising:
  receiving, from a client device, a configuration request for a software application, wherein:
    the configuration request comprises information identifying an environment of the client device, and
    the environment of the client device comprises either a development environment or a production environment in which the software application is executed;
  comparing the configuration request to a baseline configuration and a custom configuration, wherein:
    the baseline configuration comprises values for a plurality of dynamic properties of the software application, and
    the custom configuration comprises values for a subset of the plurality of dynamic properties of the software application;
  determining, based on the comparing, that the custom configuration is applicable to the environment of the client device;
  generating a signature that is based on at least:
    the values for the subset of the plurality of dynamic properties of the software application from the custom configuration; and
    a secret that is shared with the client device; and
  providing, to the client device, the signature and a client configuration comprising the values for the plurality of dynamic properties of the software application from the baseline configuration, wherein values from the baseline configuration for the subset of the plurality of dynamic properties of the software application are replaced in the client configuration by the values for the subset of the plurality of dynamic properties of the software application from the custom configuration.

16. The non-transitory computer-readable medium of claim 15, wherein the method further comprises:
  receiving an updated baseline configuration;
  receiving, from a given client device, a given configuration request, wherein the given configuration request comprises information identifying an environment of the given client device; and
  upon determining, based on the given configuration request, that the custom configuration is applicable to the environment of the given client device: providing, to the given client device, a given client configuration comprising the values from the updated baseline configuration wherein the values of the subset of the plurality of dynamic properties are replaced by the values from the custom configuration.

17. The non-transitory computer-readable medium of claim 15, wherein, before the client configuration is provided to the client device, the client configuration is verified by:
  determining, based on a matrix file comprising permissible configurations, whether the client configuration is permissible.

18. The non-transitory computer-readable medium of claim 15, wherein the method further comprises:
  receiving an updated custom configuration;
  receiving, from a given client device, a given configuration request, wherein the given configuration request comprises information identifying an environment of the given client device; and
  upon determining, based on the given configuration request, that the custom configuration is applicable to the environment of the given client device: providing, to the given client device, a client configuration comprising the values from the baseline configuration wherein the values of the subset of the plurality of dynamic properties are replaced by the values from the updated custom configuration.

19. The non-transitory computer-readable medium of claim 15, wherein the client device authenticates the client configuration based on the signature associated with the client configuration.

20. The non-transitory computer-readable medium of claim 15, wherein the client configuration is encrypted, and the client device decrypts the client configuration using an encryption key.

21. The non-transitory computer-readable medium of claim 15, wherein the client configuration is encrypted, and the client device decrypts the client configuration using an encryption key.

* * * * *